(12) United States Patent
Marguerettaz et al.

(10) Patent No.: US 7,402,614 B2
(45) Date of Patent: Jul. 22, 2008

(54) PIGMENTED INK COMPOSITION

(75) Inventors: Xavier Marguerettaz, Martigny (CH); Thomas Tiller, Bussigny (CH); Edgar Muller, Fribourg (CH); Frederic Gremaud, Epagny (CH); Sylvain Jaquier, Semsales (CH)

(73) Assignee: SICPA Holding S.A., Prilly (CH)

( * ) Notice: Subject to any disclaimer, the term of this patent is extended or adjusted under 35 U.S.C. 154(b) by 4 days.

(21) Appl. No.: 10/492,719

(22) PCT Filed: Oct. 29, 2002

(86) PCT No.: PCT/EP02/12041

§ 371 (c)(1),
(2), (4) Date: Apr. 14, 2004

(87) PCT Pub. No.: WO03/044102

PCT Pub. Date: May 30, 2003

(65) Prior Publication Data

US 2004/0266908 A1   Dec. 30, 2004

(30) Foreign Application Priority Data

Nov. 23, 2001   (EP) .................................. 01127907

(51) Int. Cl.
*C09D 11/00* (2006.01)
*C09D 11/10* (2006.01)
*C09D 11/02* (2006.01)
*C08K 3/00* (2006.01)

(52) U.S. Cl. ...................... 523/160; 523/161; 524/437; 524/423; 524/395; 524/556; 524/555; 106/31.13; 106/31.25; 106/31.26; 106/31.6

(58) Field of Classification Search ................. 523/160, 523/161, 205, 200; 524/395, 423, 437, 555, 524/556; 106/31.13, 31.25, 31.26, 31.6
See application file for complete search history.

(56) References Cited

U.S. PATENT DOCUMENTS

| | | | |
|---|---|---|---|
| 4,425,469 A | | 1/1984 | Emmons et al. |
| 5,328,504 A | * | 7/1994 | Ohnishi ....................... 524/388 |
| 5,889,083 A | * | 3/1999 | Zhu ............................ 523/161 |
| 5,939,468 A | * | 8/1999 | Siddiqui ..................... 523/161 |
| 6,309,452 B1 | * | 10/2001 | Beach et al. .............. 106/31.27 |
| 6,454,843 B2 | * | 9/2002 | Matsuda .................. 106/31.43 |
| 6,890,584 B2 | * | 5/2005 | Leenders et al. .............. 427/58 |
| 2002/0045679 A1 | * | 4/2002 | Takao et al. ................. 523/161 |
| 2002/0061940 A1 | * | 5/2002 | Lach et al. .................. 523/160 |
| 2002/0147252 A1 | * | 10/2002 | Adams ....................... 523/161 |
| 2003/0060537 A1 | * | 3/2003 | Palazzo ...................... 523/160 |

FOREIGN PATENT DOCUMENTS

| | | |
|---|---|---|
| EP | 0853106 | 7/1998 |
| JP | 58141256 A * | 8/1983 |
| WO | WO 01/79363 | 10/2001 |

* cited by examiner

*Primary Examiner*—Sanza L McClendon
(74) *Attorney, Agent, or Firm*—Shoemaker and Mattare

(57) ABSTRACT

Re-dispersible pigmented printing ink compositions, preferably for the continuous ink jet printing process are obtained by the addition of a flocculating agent to the pigment dispersion in the printing liquid. The compositions do not form hard sediments and are easy to re-disperse on stopping and resuming the printing operations. Suitable flocculating agents bind the pigment particles in the sediment into three-dimensional "airy" structures, which are easy to break up. The ink compositions of the invention are furthermore characterized by a good printability in the dispersed state.

11 Claims, No Drawings

PIGMENTED INK COMPOSITION

FIELD OF INVENTION

The invention is in the field of inks preferably inks for the continuous-ink-jet printing. It concerns in particular pigmented security ink-jet ink formulations, containing inorganic luminescent pigments, which are easy to put into homogeneous dispersion condition (i.e. which have a good redispersibility) upon startup of the printing equipment, which remain homogeneously dispersed during printing operation, which avoid obstruction (clogging) of the printer nozzles, and which furthermore result in printed features of excellent contrast, adherence, as well as resistance against light, humidity, bleach and other adverse environmental influences.

BACKGROUND OF THE INVENTION

In the technique of continuous-ink-jet printing, such as first described in U.S. Pat. No. 3,369,252, a stream of liquid ink is subdivided into a sequence of small droplets by a piezoelectric resonator, vibrating at a frequency of the order of 50 kHz or more. The droplets are projected out of a nozzle towards the substrate. The electric potential against ground of said nozzle, and thus the electric charge of the resulting ink droplets, is controlled by an addressing electrode. Two deflector electrodes, arranged along the projection path of said ink droplets, are held on predefined, constant electric potentials. They deflect the ink droplets according to their electric charge and make them impact on different locations on the substrate. By applying a corresponding electric pulse of appropriate voltage and duration to the addressing electrode, a single ink droplet can be addressed and directed to a specific location on the substrate. In the absence of an addressing voltage, the projected ink droplets are collected by a small collecting funnel, from where they are recycled to an ink reservoir. Refinements to the described printing method and equipment include the use of uncharged or slightly opposite charged guard drops between the printing droplets, such as first proposed in U.S. Pat. No. 3,562,757, in order to minimize the effects of the mutual repulsion between droplets having the same electric charge. Further refinements to the printing method are proposed in U.S. Pat. No. 3,828,354; U.S. Pat. No. 3,833,910; U.S. Pat. No. 3,846,800; U.S. Pat. No. 4,688,048; as well as in many other publications.

Inks for the continuous-ink-jet printing are normally of the soluble-dye type, in order to provide for the necessary homogeneity, and thus, an easy runnability on the printing machine. The inks may furthermore be formulated as solvent-based or water-based liquids. The later option is increasingly preferred, due to the ever growing environmental restrictions which apply to the use of organic solvents. However, printings made with such inks lack in general resistance against environmental influence, and they are also affected by solvents and/or water. Waterfast inks in particular are highly desirable for the production of permanent indicia or images.

Pigmented inks for the continuous-ink-jet printing are known in the art and first described in U.S. Pat. No. 4,365,035. More recent publications include EP 751,194 and EP 853,106. Particular technical problems arise from the heterogeneous nature of the ink, which must be solved through the use of particular dispersing additives, and, principally, through a continuous stirring and circulating of the ink during printing operation.

Pigment particles for ink-jet printing are preferably smaller than 1 micrometer, more preferably even smaller than 300 nanometers. However, the presence of some particles as large as 5 micrometers can be tolerated in an ink-jet formulation. In particular, ink-jet inks are generally passed through a filter of 10 micrometer pore size, in order to eliminate pigment fractions or agglomerates larger than this, which could obstruct the printing nozzles.

Existing solutions to maintain the pigmented ink dispersed during printing operation, and to prevent hard settling of the pigment between printing operations, include the following approaches:

In U.S. Pat. No. 6,062,682 the ink cartridge is moved along a carrier shaft such as to stir the pigment, and in U.S. Pat. No. 5,451,987 the ink- and recovery-reservoirs are equipped with means, such as a magnetic stirrer, for agitating the ink.

U.S. Pat. No. 5,650,802 suggests the use of a vibrating piezo element to prevent the pigment suspension from settling outside the printing periods.

Alternatively, a re-circulation of the ink in the system at regular frequency has also been successfully used to maintain the ink in an appropriate state of dispersion. Such a system is currently exploited in the OPAQUE DOMINO CIJ printers.

In the field of security printing, it would be highly desirable to have available ink-jet inks which resist to the influence of light and to commonly available chemical agents, such as household bleach or solvents of the most various kind. Such inks could noteworthy serve for the rapid and reliable on-line numbering of security documents, such as banknotes, identity documents, lottery tickets, warranty labels and the like.

A particular type of waterfast security inks for the ink-jet numbering of lottery tickets has been disclosed in U.S. Pat. No. 5,498,283. However, the disclosed inks do merely contain an organic dye which has improved resistance to bleach; formulations containing inorganic luminescents are not disclosed.

To provide for an appropriate intensity of the luminescence response, inorganic security pigments have generally a particle size of greater than 300 nm. Example of such pigments can be found in the disclosures of U.S. Pat. No. 5,891,361; U.S. Pat. No. 6,132,642 and WO 00/63317. Below said particle size, the surface-to-volume ratio of the particles, and thus the influence of the surface defects responsible for luminescence quenching, becomes too important, resulting in a strong drop of the luminescence quantum yield.

The addition, to a continuous ink jet ink, of inorganic luminescents of said mentioned types noteworthy presents a couple of particular problems, which are due to the relatively high specific weight of said inorganic compounds, as compared to that of the printing liquid, to the required pigment size, as well as to the very low viscosity of the printing fluid. This results in a strongly increased tendency of the pigment to sediment, forming furthermore relatively dense deposits which are difficult to redisperse. After a stop and restart of the printing operations, not all pigment is thus necessarily redispersed; some of it remaining settled in the corners of the ink reservoir. Moreover, hard sedimentation of the inorganic pigment, when occurring between printing operations or during prolonged storage periods, is very difficult to redisperse and requires high shear mixing forces to put the pigment back into suspension.

Hard sedimentation results in a change in concentration of the active ingredient with time, which is not compatible with the stringent standards of security printing.

The combination of a particularly enhanced stirring and circulating of the printing liquid during operation, together with the use of an ink formulation according to the present invention, are efficiently used to remedy this problem.

SUMMARY OF THE INVENTION

The shortcomings of the inks according to the prior art are avoided by using an ink composition of the present invention.

The inventors surprisingly found that a partial flocculation (destabilization) of the ink suspension turned out to be beneficial to its overall properties. The redispersion of a partially flocculated ink suspension turned out to be significantly improved, without perturbing the print-ability of the ink.

The printing ink composition comprises at least one solvent, a binder system, optional defoaming, humectant and conductivity control agents, and at least one pigment; the composition being characterized in that it additionally comprises at least one flocculating agent, which flocculating agent is capable of forming a re-dispersible sediment of said pigment in said composition.

The solvent is preferably selected from the group comprising water, alcohols (such as methanol, ethanol, etc.), ketones (such as acetone, methyl-ethyl-ketone, etc.) and esters (such as methyl acetate, ethyl acetate, methyl propionate, etc.) or mixtures thereof.

The binder system comprises at least one polymer compound suitable for ink-jet ink applications. Mixtures of different polymer compounds are usable as well. The polymer compounds are preferably chosen among the thermoplastic resins and are furthermore chosen such as to be compatible with the solvent. For aqueous ink formulations, the binder system is preferably, but not exclusively, chosen from the group comprising water-soluble resins, such as vinylpyrrolidone polymers and copolymers, water soluble polyesters, salts of acrylic and maleic anhydride polymers and copolymers, polyvinyl alcohol, cellulose derivatives, polyethyleneimides, etc., or from the group of film forming emulsions of fine polymer particles (<1 μm), e.g. latex polymers of the various kinds known in the art.

For solvent especially organic solvent based systems, solvent soluble thermoplastic resins are preferred, such as acrylic resins, e.g. poly (methylmethacrylate), vinylic resins, e.g. vinyl acetate/vinyl chloride copolymers, polyvinylbutyral resins, cellulose resins, e.g. nitrocellulose, acetylcellulose etc., polyurethane resins, polyester resins, or polyamine resins. Alternatively phenolic and epoxy resins can be used as well.

Depending on the mole weight ($M_W$) of the binder resin, different amounts of resin are incorporated into the inkjet ink formulation, in order to reach a viscosity in the range of between 2 and 10 mPa.s (at 25° C.), preferably of between 3 and 7 mPa.s (at 25° C.). Preferable amounts of binder lie between 0.5 and 20% and more preferably between 2% and 15% by weight of the ink's total weight.

The pigments used in an ink composition of the invention are preferably security pigments, i.e. pigments which are not otherwise used in commercial printing processes, and may be selected either from organic or from inorganic pigments. Preferably, luminescent pigments are used. Organic luminescent pigments may include appropriate derivatives of phthalocyanine, naphthalocyanine, perylene and other polycyclic aromatic hydrocarbons, quinazolinone, oxazole, quinone, napthalimide, etc., or mixtures thereof. Preferably inorganic luminescent pigments are selected, chosen from the class of activator-doped crystalline solid-state compounds, such as activator-doped zinc sulfides, oxysulfides, vanadates, fluorides, oxides and oxyfluorides of yttrium and the rare-earths, or mixtures thereof.

In order to stabilize or disperse the pigment in the ink composition preferably a dispersing agent is added to the ink composition. This dispersing agent allows to distribute the pigments homogeneously throughout the ink composition and further helps to ensure a continuous good printability of the ink composition, even after a prolonged storage period.

By adding an appropriate amount of a flocculating agent to a pigmented ink-jet ink, a partial destabilisation of the printing fluid suspension was obtained, through a reversible, controlled, weak flocculation of the pigment. Said partial destabilisation resulted on one hand in a faster settling of the pigment, but on the other hand yielded a much softer sediment, which was very easily redispersed upon the application of a small mechanical movement (stirring or shaking). In particular, sedimented inks could be completely redispersed using a simple magnetic stirrer at 200 rpm for a duration of two minutes.

Flocculation is a technique known to the one skilled in the art, which is used to render fine suspensions, being otherwise difficult to filter or to decant, coarser through the action of particle agglomeration. In the field of printing, in particular, two different types of flocculation processes are distinguished, i.e. a "controlled" or "slow" flocculation, resulting in a "soft" deposit, and an "uncontrolled" or "rapid" flocculation, resulting in a "hard" deposit. Their definitions are given in Römpp's Lexikon "Lacke und Druckfarben" (p. 240, 1998), as well as in Ullmanns "Encyclopädie der Technischen Chemie" (Vol. 11, p. 581-586, $4^{th}$ edition, 1976) and the content of these definitions is included within the application. The "controlled flocculation" is thus described as a slow sedimentation of the suspended particles, preventing the creation of densely packed and difficult to redisperse sediments. "Controlled flocculating agents" are thus chemical compounds which, upon addition to a suspension, allow to obtain a "soft sediment". The resulting flocculated product is generally redispersible, but it flocculates again upon removal of the agitation. This is due to the ease of formation and breaking of the chemical hydrogen bonds, coordination bonds, or Van-der-Waals forces, which are associating the flocculated particles. A flocculating agent as used according to the invention is selected from these types of "controlled" flocculating agents which are capable of forming redispersable "soft" sediments in such a way as described above.

Provided that the amount of flocculating agent is properly dosed as a function of pigment nature, amount and particle size, the extent of flocculation can be adjusted to fall between the two non-workable extremes, as found by our experimental work:

(i) A too strong flocculation (large amount of added flocculating agent) resulted in a very fast total sedimentation (<15 min.) but imparted strongly on the stability of the printing fluid, resulting in a poor print-ability of the ink.

(ii) A too weak flocculation (too small or zero amount of added flocculating agent) resulted in a very slow sedimentation (>48 h); the resulting ink had a very good print-ability but was impossible to redisperse without applying high shear mixing forces after standing for some days.

The selection of the flocculating agent used in a composition according to the invention is dependent on the specific properties of the solvent, the binder system or further required compounds of the composition, thus the flocculating agent or its interactions with the components has to be "compatible" with these components of the ink composition; a person skilled in the art will be able to make the correct selection.

For water based liquids, flocculating agents (flocculents) can be of two types:

i) inorganic flocculating agents comprising inorganic salts, especially salts of aluminum, calcium or iron(III) cations, for example aluminum sulfate or iron(III) chloride, calcium chloride, etc. These cations hydrolyze to form inorganic hydroxy-polymers at the pH value of the solution. The fine particles, suspended in the liquid containing the flocculent, chemically bind to the hydrolyzed metal salt via the action of hydrogen bridges; i.e. the particles get covered with a thin layer of metal hydroxide. It is the interaction between the so coated surfaces of the particles, which makes them associate, forming larger aggregates which eventually precipitate.

ii) organic flocculating agents comprising organic polymers carrying functional groups which are able to interact with and bind to the surface of the particles. The flocculation mechanism is the same as in the case of hydrolyzing metal salts. Examples of such polymers are polyacrylates, hydrolyzed polyacrylamide, polysulfonate, polyphosphates and polyphosphonates (anionic), polyimines, quaternized polyamines (cationic), polyacrylamide (nonionic), etc. Combinations of anionic and cationic flocculents can also be employed to enhance the flocculation effect.

For organic-solvent based liquids, the controlled flocculating agents are principally but not exclusively of polymeric nature. They bind to the particles and act by building "bridges" between single pigment particles through remaining free chemical functional groups, resulting in a three-dimensional network implying said particles. Examples of such polymers are polycarboxylic acids or salts of polycarboxylic acids, alkylammonium salts of polycarboxylic acids, polyamines or salts of polyamines, polycarboxylic acid salts of a polyamine amide, polyamides, alkylolammonium salts of an unsaturated fatty acid, low molecular weight unsaturated polycarboxylic acid polyesters, carboxylic acids or phosphonic acids having formula $R_1PO_3(R_2)_2$ (with $R_1$=H, alkyl; $R_2$=H, alkyl or aryl) and their salts, etc. or mixtures thereof.

Controlled flocculating agents are also known as stabilizing additives for solvent-based paint systems. Such systems are generally high in pigment content, i.e. they have a solid content of the order of 30% by weight. Addition of said stabilizing additives leads to a controlled flocculation of the solids, i.e. "bridges" are formed between the single suspended pigment particles, causing an "airy" 3-dimensional structure to develop, which fills up the entire volume of the liquid. Paints obtained through so controlled flocculation of the pigment show marked thixotropy and a less compact specific weight of the flocculated precipitate than that resulting from mere pigment sedimentation in the absence of the flocculating agent. In particular, by choosing appropriate conditions, the flocculated precipitate occupies the entire volume of the paint, and flooding floating, settling and sagging of the pigment are completely avoided.

The ink composition according to the invention can be applied for printing methods which use liquid inks. Such liquid printing inks used may be for example drop-on-demand inks, gravure inks, helio-flexo inks, screen-printing inks, ink-jet inks etc. Preferably a composition according to the invention may be used for ink-jet printing applications.

Coating additives to achieve controlled flocculation are known to the skilled in the art and are commercially available. In particular, the "Anti-Terra®" and "Bykumen®" products of BYK Chemie GmbH, Wesel, Germany are well known stabilizing agents which are recommended for solvent based paint system. They act precisely as controlled flocculating agents which stabilize the pigment dispersion by forming a loose 3-dimensional network between the individual pigment particles. Noteworthy, Anti-Terra®-203 is a solution of an alkyl-ammonium salt of a polycarboxylic acid; Anti-Terra®-204/205 are solutions of a polycarboxylic acid salt of polyamine amides; Anti-Terra®-206 is a solution of an alkylolammonium salt of an unsaturated fatty acid; and Bykumen® is a solution of a lower molecular weight unsaturated acidic polycarboxylic acid polyester. Similar products are also available from other suppliers (for example EFKA, the 5xxx range of products).

Initially it was tried to "stabilize" an ink-jet ink in a similar way as the one recommended for stabilizing paints. However, because the solid content of an ink-jet ink is only of the order of 3% of the inks total weight, e.g. about ten times less than the solid content of a paint, the addition of Anti-Terra® to the suspension of pigments did not result in preventing pigment settling, as it was first expected, but, in contrary, it was strongly accelerating the pigment settling process.

Surprisingly, we found that the Anti-Terra® flocculated pigment formed a soft sediment, which was easy to redisperse, and which could be printed after redispersion without any clogging of the printer nozzles. To all evidence, the admixture of such additives to pigmented ink-jet inks acted upon the suspension of solids in a very similar way as in paints by forming reversible three-dimensional agglomerates. Contrary to what happens in paints, the three-dimensional agglomerate formed from pigmented ink-jet inks has not a sufficient volume to occupy on one hand the whole space of the liquid; thus, precipitation is observed. On the other hand, surprisingly, the sediment formed in such a way is by far not as compact as the sediment formed in the absence of said flocculating additive; the flocculated sediment remains redispersible, and the redispersed liquid remains ink-jet printable.

The concentration of the flocculating agent must be chosen such as to properly interact with the available particle surface. Useful concentrations are in the range of 0.01 to 20% of the inorganic pigment weight depending on the nature and the mole weight of the flocculent, on the polarity of the solvent in the fluid, as well as on the available particle surface. A too low concentration of flocculating agent will result in an insufficient agglomeration (the particles are only partly covered with flocculent); too high concentrations will result in a good flocculation effect, but with excessive flocculent available which leads to unwanted secondary effects.

Further, additional compounds like dispersing agents (such as myristic acid, Gantrez AN, Zephrym etc.), defoamers (such as BYK®-022 (polyglycols), BYK®-024 (polysiloxane), humectants (such as glycols, glycols ethers, N-methylpyrrolidone, etc.), conductivity agent (electrolytes such as $LiNO_3$, tetrabutyl ammonium chloride, sodium p-toluensulfonate, etc. ), plasticisers (e.g. citroflex, phtalates, etc.), adhesion promoters (silanes, titanium organates, etc.) and biocides, can be added to the ink-jet ink composition.

EXEMPLARY EMBODIMENTS

A first embodiment of the invention concerns an ink-jet ink comprising an erbium/ytterbium activated up-converting yttrium oxysulfide luminescent of the formula $Y_2O_2S$:Er,Yb. The luminescent product has a mean particle size of the order of one micrometer. The ink comprises further a polymeric thermoplastic binder (Polyvinylbutyral resin) dissolved in a solvent (Ethanol), a surfactant to support the dispersion of the pigment, a salt to ensure electrical conductivity of the ink, a humectant to prevent printer nozzle clogging and the controlled flocculating agent Anti-Terra®-204 (or EFKA 5054). Good printability and good redisperseability were obtained for this embodiment.

A good redisperseability of the pigmented continuous-ink-jet printing ink can also be obtained, according to the present invention for an aqueous suspension of the inorganic pigment, applying the same principle of controlled flocculation.

A second embodiment of the invention concerns an ink-jet ink comprising a down-converting luminescent pigment (a copper-activated zinc sulphide), having a mean particle size of 300 nanometers. It also comprises a dispersant/binder (polycarboxylic acid sodium salt) and water as the solvent. The stable suspension could be reversibly flocculated upon the addition of a polymeric flocculating agent of the said types. Alternatively, reversible flocculation could also be induced by the addition of sodium hydroxyde, $FeCl_3$ or by the use of a flocculating agent acting on the electrostatic stability of the suspension (ZetaG). The resulting meta-stable suspension is partially sedimented (soft sedimentation) over 24 hours but is readily redispersed upon the application of a small mechanical movement. Moreover the printability and luminescence signal of the prints are not affected by the addition of the "flocculating" agent.

A good redispersability of the pigmented continuous-ink-jet printing ink can also be obtained, according to the present invention, by providing the pigment in two different states; part of the pigment having a soft sedimentation behavior (controlled weak flocculation), and part of the pigment having a harder sedimentation behavior. The mixture of the two types of suspension results in a fractional sedimentation effect as can be seen in the third embodiment.

A third embodiment of the invention concerns thus an ink-jet ink formulation comprising an erbium/ytterbium activated up-converting yttrium oxysulfide luminescent of the formula $Y_2O_2S:Er,Yb$. The luminescent product has a mean particle size around one micrometer. The formulation also comprises a polymeric thermoplastic resin, dissolved in a solvent (Ethanol/Methyl-Ethyl-Ketone, MEK), a surfactant to support the dispersion of the pigment, a salt to ensure electrical conductivity of the ink, a humectant to prevent printer nozzle clogging and the controlled flocculating agent, Anti-Terra® (or EFKA) as additives.

As described in the first embodiment, a first part of the pigment suspension (fluid A) is flocculated by using a polymeric flocculating agent in the milling process. The obtained suspension (fluid A) is then added to a second part of the pigment suspension (fluid B), which is free of flocculating agent, and mixed thoroughly, to result in a printing liquid exhibiting a differential sedimentation effect. The weight ratio of the flocculated suspension (fluid A) to the non flocculated suspension (fluid B) can vary between 0.4 to 2.5 in the overall formulation.

Therefore if the hard sedimentation of the non flocculated part of the pigment occurs later in time than the soft sedimentation of the flocculated part of the pigment, the whole sediment can be very easily redispersed. This is because its bottom consists of "soft sediment" which is easy to redisperse and which takes as well the overlayer of hard sediment into dispersion. Moreover, the printability of the ink is not affected by the presence of the partially flocculated pigment; as soon as the ink is stirred and circulated, the flocculated agglomerates break up again into individual particles.

The pigment used as a redispersion help must not necessarily be of the same type as the luminescent security pigment, as shown in the next embodiment:

A fourth embodiment of the invention concerns an ink-jet ink, comprising an erbium/ytterbium activated up-converting yttrium oxysulfide luminescent pigment of the formula $Y_2O_2S:Er,Yb$, as a first pigment which has a mean particle size around one micrometer. Said first pigment is dispersed in a fluid A, comprising a polymeric binder (vinyl chloride copolymer), a solvent (MEK), a surfactant to disperse the pigment, a humectant (Dowanol DPM), and a salt to impart electrical conductivity to the ink. The second pigment is a down-converting luminescent (a copper-activated zinc sulfide), having a mean particle size of 300 nanometers, which is dispersed in fluid B. Fluid B also comprises a polymeric binder (vinyl chloride copolymer), a solvent (MEK), a surfactant to disperse the pigment, a humectant (Dowanol DPM), a salt and a controlled flocculating agent.

By mixing fluid A and fluid B, in proportions A:B varying between 0.4 and 2.5 of weight ratio a printing liquid is obtained, exhibiting a differential sedimentation effect, producing a bottom layer of soft sediment, covered by a layer of hard sediment. The whole sediment is easily redispersed. Moreover this printing fluid has both, good printability imparted by fluid A, and good redispersion properties imparted by fluid B.

The invention will be further outlined by the following formulation examples, which are intended to be purely illustrative of the invention and which are in no way limiting its scope:

EXAMPLE 1

This example illustrates the preparation of an embodiment of the present invention wherein the total amount of inorganic security pigment was dispersed in the presence of the controlled flocculating agent, Anti-Terra®, forming a meta-stable suspension ink. Appropriate dosing of the controlled flocculating agent in a weight ratio between 0.1 and 10%, preferably of 0.5 to 3%, of the inorganic pigment's weight (depending on the nature and particle size of the pigment and on the polarity of the solvent), is used to produce soft sediments which are easily redispersed and whose dispersion is stable enough under stirring and ink circulation to offer a good printability of the ink. At higher weight ratio, the flocculation is too fast, leading to an unstable ink which sediments very quickly and results in a poor printability. At lower weight ratio, the stable suspension settles too slowly, producing a hard sediment which requires high shear rate mixing to redisperse it. The following ingredients were employed in the indicated weight amounts.

| Ingredients for the millbase 1 | Parts |
| --- | --- |
| Ethanol | 240 |
| Pioloform BL 18 (Wacker Chemie) | 80 |
| Zephrym PD 7000 (ICI) | 10 |
| Anti-Terra 204 (Byk Chemie) | 0.4 |
| Yttrium oxysulfide luminescent $Y_2O_2S:Er, Yb$ | 40 |

The inorganic pigment was first pre-dispersed in the above millbase using a high shear rate mixer for about 15 minutes. Remaining pigment agglomerates in the millbase were then broken up by a bead milling passage ($ZrO_2$ beads, 2 mm diameter).

| Ingredients for the ink 1 | Parts |
|---|---|
| Millbase 1 | 370 |
| LiNO$_3$ (Fluka) *** | 15 |
| Ethanol | 595 |
| Dowanol DPM (Dow) | 20 |

*** providing electric conductivity

The ingredients were mixed together to yield the ink-jet ink according to the present invention.

EXAMPLE 2

This example illustrates the preparation of another embodiment of the present invention wherein the total of the inorganic security pigment present was dispersed in a solvent (water) in the presence of a polycarboxylic sodium salt dispersant, thus forming a stable suspension. The controlled flocculating agent was introduced after the milling step into the stable suspension, partially destabilising the ink and favoring its redispersion. The following ingredients were thus employed in the indicated weight amounts.

| Ingredients for the Millbase 2 | Parts |
|---|---|
| Water | 106 |
| Sodium Hydroxide (Fluka) | 4 |
| Gantrez AN BF 119 (ISP) | 8 |
| Copper-activated zinc sulphide pigment | 42 |

The inorganic pigment was first pre-dispersed in the above millbase using a high shear rate mixer for about 15 minutes. Remaining pigment agglomerates in the millbase were subsequently broken up by a bead milling passage (ZrO$_2$ beads, 2 mm diameter). The NaOH serves in this context as a neutralizing agent for the binder component.

| Ingredients for the ink 2 | Parts |
|---|---|
| Millbase 2 | 160 |
| Water | 800 |
| ZETAG 7125 (Ciba SC) | 4 |
| Dowanol DPM (Dow) | 20 |

The ingredients were mixed together to yield the ink-jet ink 2 according to the present invention.

EXAMPLE 3

This example illustrates the preparation of an embodiment of the present invention wherein only part of the inorganic security pigment present was dispersed in the presence of the controlled flocculating agent, Anti-Terra®-203, to form a meta-stable suspension ink (ink 3A). The remaining part of the pigment was dispersed in the absence of controlled flocculating agent, forming a stable suspension ink (ink 3B). Finally the two inks parts were mixed in an appropriate ratio, to produce an ink showing a fractional sedimentation effect (i.e. a rapidly falling out soft sediment, covered by a slowly falling out hard sediment), which has both, good redispersability and good printability.

Appropriate dosing of the controlled flocculating agent in ink A in a ratio between 0.1 and 10%, by weight, of the inorganic pigment produces a soft sediment which is easily redispersible but whose dispersion is stable enough to offer good printability. The weight ratio of flocculating agent to inorganic pigment more preferably lies between 0.5 to 3% to provide optimum redispersion properties to the ink of example 3. At higher ratio the flocculation is too fast, leading to an unstable ink which sediments very quickly and has poor printability. At lower ratio, the stable suspension settles too slowly, producing a hard sediment which requires high shear force mixing to redisperse. The following ingredients were employed in the indicated amounts.

| | Parts |
|---|---|
| Ingredients for the millbase 3A | |
| Methyl Ethyl Ketone | 100 |
| Paraloid DM-55 (Rohm & Haas) | 30 |
| Ethanol | 120 |
| Pioloform BL 18 (Wacker Chemie) | 40 |
| Myristic acid (Fluka) | 5 |
| Anti-Terra 203 (Byk Chemie) | 1 |
| Yttrium oxysulfide luminescent Y$_2$O$_2$S:Er, Yb | 40 |
| Ingredients for the millbase 3B | |
| Methyl Ethyl Ketone | 100 |
| Paraloid DM-55 (Rohm & Haas) | 30 |
| Ethanol | 120 |
| Pioloform BL 18 (Wacker Chemie) | 50 |
| Myristic acid (Fluka) | 10 |
| Yttrium oxysulfide luminescent Y$_2$O$_2$S:Er, Yb | 40 |

The inorganic pigments were first pre-dispersed in the above millbases using a high shear force mixer for about 15 minutes. Remaining pigment agglomerates in the millbase were then broken up by a bead milling passage (ZrO$_2$ beads, 2 mm diameter).

| | Parts |
|---|---|
| Ingredients for the ink 3A | |
| Millbase 3A | 310 |
| Tetrabutylammonium chloride (Fluka) *** | 10 |
| Ethanol | 660 |
| Dowanol DPM (Dow) | 20 |
| Ingredients for the ink 3A | |
| Millbase 3B | 310 |
| Tetrabutylammonium chloride (Fluka) *** | 10 |
| Ethanol | 660 |
| Dowanol DPM (Dow) | 20 |
| Ingredients for the ink 3 | |
| Ink 3A | 500 |
| Ink 3B | 500 |

*** providing electric conductivity

The ingredients were mixed together to yield the ink-jet ink according to the present invention.

EXAMPLE 4

This example illustrates the preparation of an embodiment of the present invention, comprising two inorganic security pigments, wherein only one of said two inorganic security pigment was dispersed in the presence of a suitable surfactant and then reversible flocculation was obtained upon the addition of the conductivity agent (electrostatic destabilisation). The meta-stable suspension ink (ink 4A) was therefore the result of the combined action of the dispersing surfactant and of the electrostatic destabilizing conductivity agent. The other of said security pigments was dispersed in the absence of any flocculation, forming a stable suspension ink (ink 4B). Finally to prevent hard settling of ink 4B, the two inks were mixed in an appropriate ratio to produce an ink showing a fractional sedimentation effect, (i.e. a rapidly falling out soft sediment, covered by a slowly falling out hard sediment), which has both, good redispersability and good printability.

Appropriate dosage of the surfactant which acts in the presence of the present metal salt as a controlled flocculating agent in ink 4A was given by a weight ratio between 0.1 and 10% of the inorganic pigment, to create a soft sediment which was easily redispersed but whose dispersion was stable enough to offer good printability. The more preferred weight ratio of flocculating agent to inorganic pigment was found to lie between 2 to 8%, to provide for optimum redispersion of the ink of example 4A. At higher ratio the flocculation is too fast, leading to an unstable ink which sediments very quickly and has a poor printability. At lower ratio, the stable suspension settles too slowly producing a hard sediment which requires high shear force mixing to redisperse. The following ingredients were employed in the indicated amounts.

|  | Parts |
| --- | --- |
| Ingredients for the millbase 4A | |
| Methyl Ethyl Ketone | 250 |
| UCAR VMCA vinylic resin (Dow) | 130 |
| Octylphosphonic acid | 6 |
| copper-activated zinc sulfide pigment | 100 |
| Ingredients for the millbase 4B | |
| Methyl Ethyl Ketone | 250 |
| UCAR VMCA vinylic resin (Dow) | 100 |
| UCAR VROH vinylic resin (Dow) | 30 |
| Myristic acid | 50 |
| Yttrium oxysulfide luminescent $Y_2O_2S$:Er, Yb | 100 |

The inorganic pigments were first pre-dispersed in the above millbases using a high shear force mixer for about 15 minutes. Remaining pigment agglomerates in the millbase were then broken up by a bead milling passage (ZrO2 beads, 2 mm diameter).

|  | Parts |
| --- | --- |
| Ingredients for the ink 4A | |
| Millbase 4A | 500 |
| Methyl Ethyl Ketone | 470 |
| Tetrabutylammonium chloride (Fluka) *** | 10 |
| Dowanol DPM (Dow) | 20 |
| Ingredients for the ink 4B | |
| Millbase 4B | 470 |
| Methyl Ethyl Ketone | 500 |
| Tetrabutylammonium chloride (Fluka) *** | 10 |
| Dowanol DPM (Dow) | 20 |
| Ingredients for the ink 4 | |
| Ink 4A | 500 |
| Ink 4B | 500 |

*** providing electric conductivity

The ingredients were mixed together to yield the ink-jet ink according to the present invention.

The invention claimed is:

1. A redispersible pigmented printing ink composition for the continuous ink-jet printing process, said ink composition having a viscosity in the range of between 2 and 10 mPas said ink composition comprising
    at least one solvent selected from the group consisting of water and organic solvents of the group of alcohols, ketones and esters,
    a binder system in an amount between 0.5% and 20% by weight of the total ink which comprises at least one polymer compound selected from the group consisting of thermoplastic resins, and
    at least one inorganic luminescent pigment selected from the group consisting of crystalline compounds comprising activator-doped zinc sulfides, oxysulfides, vanadates, fluorides, oxides and oxyfluorides of yttrium or the rare-earth elements of the periodic table, and mixtures thereof,
    conductivity control agents, and
    at least one flocculating agent forming a re-dispersible sediment of said pigment in said composition, wherein said flocculating agent is selected from the group consisting of inorganic salts of aluminum, calcium and iron (III), and of organic polymers carrying functional groups able to interact with and bind to the surface of said pigment particles, and wherein said flocculating agent is present in a concentration range of 0.01 to 20% of the inorganic pigment weight.

2. A printing ink composition according to claim 1, further comprising defoaming, and humectant agents.

3. A printing ink composition according to claim 1, further comprising at least one dispersing agent.

4. A printing ink composition according to claim 1, wherein said flocculating agent is an organic flocculating agent selected from the group consisting of polycarboxylic acids or salts of a polycarboxylic acid, polyamines or salts of a polyamine, polycarboxylic acid salts of a polyamine amide, polyamides, alkylolammonium salts of an unsaturated fatty acid, polyacrylates, hydrolyzed polyacrylamide, polyimines, (poly)phosphates, (poly)phosphonates, quaternized polyamines, and polyacrylamides or mixtures thereof.

5. A printing ink composition according to claim 1, wherein said solvent is water, and said thermoplastic resin is selected from the group consisting of water-soluble resins comprising vinylpyrrolidone polymers and copolymers, water-soluble polyesters, salts of acrylic and maleic anhydride polymers and copolymers, polyvinylalcohol cellulose derivatives, and polyethyleneimides.

6. A printing ink composition according to claim 1, wherein said solvent is an organic solvent selected from the group consisting of alcohols, ketones and esters, and said thermoplastic resin is selected from the group consisting of acrylic resins, vinylic resins, polyvinylbutyral resins, cellulose resins, polyurethane resins, polyester resins, polyamine resins, phenolic resins and epoxy resins.

7. A process of using a printing ink composition according to claim 1 for printing security documents or articles, comprising the steps of providing said printing ink composition and printing therewith said security documents or articles by means of a continuous ink-jet printer.

8. A process according to claim 7, wherein said security document is selected from the group consisting of banknotes, identity documents, lottery tickets, and warranty labels.

9. A method for enhancing the redispersibility of pigment sediments in a pigmented printing ink composition according to claim 1 for the continuous ink-jet printing process, said ink composition having a viscosity in the range of between 2 and 10 mPas, said method comprising the steps of
  (a) providing a printing ink composition comprising at least one solvent selected from the group consisting of water and organic solvents of the group of alcohols, ketones and esters, a binder system in an amount between 0.5% and 20% by weight which comprises at least one polymer compound selected from the group consisting of thermoplastic resins, at least one inorganic luminescent pigment selected from the group consisting of crystalline compounds comprising activator-doped zinc sulfides, oxysulfides, vanadates, fluorides, oxides and oxyfluorides of yttrium or the rare-earth elements of the periodic table, and mixtures thereof, and conductivity control agents; and
  (b) adding at least one flocculating agent forming a redispersible sediment of said pigment in said composition, wherein said flocculating agent is selected from the group consisting of inorganic salts of aluminum, calcium and iron (III), and of organic polymers carrying functional groups able to interact with and bind to the surface of said pigment particles, and wherein said flocculating agent is present in a concentration range of 0.01 to 20% of the inorganic pigment weight.

10. A method of manufacturing a pigmented printing ink composition according to claim 1 for the continuous ink-jet printing process, said ink composition having a viscosity in the range of between 2 and 10 mPas, said method comprising the steps of:
  (a) providing at least one solvent selected from the group consisting of water and organic solvents of the group of alcohols, ketones and esters, a binder system in an amount between 0.5% and 20% by weight which comprises at least one inorganic luminescent pigment selected from the group consisting of crystalline compounds comprising activator-doped zinc sulfides, oxysulfides, vanadates, fluorides, oxides and oxyfluorides of yttrium or the rare-earth elements of the periodic table, and mixtures thereof, and conductivity control agents;
  (b) pre-dispersing the pigment in the mixture of step (a);
  (c) adding further solvent to the mixture of step (b); and
  (d) adding at least one flocculating agent, either to the mixture of step (a) or to the mixture of step (c), wherein said flocculating agent forms a re-dispersible sediment of said pigment in said composition, wherein said flocculating agent is selected from the group consisting of inorganic salts of aluminum, calcium and iron (III), and of organic polymers carrying functional groups able to interact with and bind to the surface of said pigment particles, and wherein said flocculating agent is present in a concentration range of 0.01 to 20% of the inorganic pigment weight.

11. A method according to claim 10, wherein in step a) furthermore dispersing, defoaming, and humectant agents are provided.

* * * * *